(12) United States Patent
Lipcsei et al.

(10) Patent No.: US 8,737,099 B2
(45) Date of Patent: May 27, 2014

(54) CONTROLLERS FOR POWER CONVERTERS

(75) Inventors: Laszlo Lipcsei, Campbell, CA (US);
Alin Gherghescu, Santa Clara, CA (US); Catalin Popovici, Santa Clara, CA (US)

(73) Assignee: O2Micro, Inc., Santa Clara, CA (US)

( * ) Notice: Subject to any disclaimer, the term of this patent is extended or adjusted under 35 U.S.C. 154(b) by 278 days.

(21) Appl. No.: 13/184,327

(22) Filed: Jul. 15, 2011

(65) Prior Publication Data
US 2013/0016530 A1 Jan. 17, 2013

(51) Int. Cl.
*H02M 3/24* (2006.01)

(52) U.S. Cl.
USPC .............................. 363/89; 363/95; 323/222

(58) Field of Classification Search
USPC ......... 363/16–20, 21.04, 21.07, 21.12, 21.18, 363/21.14, 74, 89, 95, 97, 127, 80, 81; 323/222, 207, 210, 282–289
See application file for complete search history.

(56) References Cited

U.S. PATENT DOCUMENTS

| | | | | |
|---|---|---|---|---|
| 4,646,217 A | * | 2/1987 | Baroni et al. | 363/17 |
| 5,003,454 A | * | 3/1991 | Bruning | 363/81 |
| 5,331,533 A | * | 7/1994 | Smith | 363/20 |
| 5,612,609 A | * | 3/1997 | Choi | 323/210 |
| 5,872,705 A | * | 2/1999 | Loftus et al. | 363/21.06 |
| 5,920,475 A | * | 7/1999 | Boylan et al. | 363/127 |
| 6,961,253 B1 | * | 11/2005 | Cohen | 363/89 |
| 7,741,827 B2 | * | 6/2010 | Allinder et al. | 323/288 |
| 8,125,799 B2 | * | 2/2012 | Zhu et al. | 363/21.14 |
| 2004/0223351 A1 | | 11/2004 | Kurokami | |
| 2008/0310191 A1 | * | 12/2008 | Zhu et al. | 363/21.04 |

FOREIGN PATENT DOCUMENTS

| | | |
|---|---|---|
| DE | 4105464 A1 | 10/1991 |
| JP | S6326626 B2 | 5/1988 |
| JP | H0359667 B2 | 9/1991 |
| JP | 2009095091 A | 4/2009 |
| JP | 2010124524 A | 6/2010 |

OTHER PUBLICATIONS

"A study on high efficiency half-bridge converter using synchronous rectifier", Dongguk University, Master's thesis, published in Dec. of 1998 (47 pages).
English translation for Office Action of the corresponding Korean Patent Application No. 10-2012-0040751 dated May 22, 2013.
Office Action issued in Japanese Patent Application No. 2012-105206 dated Jul. 23, 2013 (2 pages).
Office Action issued in corresponding Germany Patent Application No. 102012204060.9 dated Sep. 20, 2013 (7 pages).
Japanese Office Action, dated Feb. 24, 2014, issued in a counterpart Japanese patent application No. 2012-10520 (3 pages) and English translation thereof (3 pages).

* cited by examiner

*Primary Examiner* — Rajnikant Patel

(57) ABSTRACT

In a controller for a power converter, a control terminal can provide a control signal to control a power converter. A cycle of the control signal includes a first time interval and a second time interval. The control circuitry can increase a primary current flowing through a primary winding of transformer circuitry and a secondary current flowing through a secondary winding of the transformer circuitry in the first time interval, and can terminate the increasing of the primary current in the second time interval. The control circuitry can also control the first time interval to be inversely proportional to an input voltage provided to the primary winding.

20 Claims, 10 Drawing Sheets

US 8,737,099 B2

CONTROLLERS FOR POWER CONVERTERS

BACKGROUND

FIG. 1 illustrates a circuit diagram of a conventional DC to DC converter 100. The DC to DC converter 100 includes a transformer 102 and a switch SW0 coupled in series with the primary winding of the transformer 102. A control signal 106 controls the switch SW0 to control the output power of the DC to DC converter 100. By way of example, the control signal 106 can turn on the switch SW0 to couple the primary winding of the transformer 102 with a power source (e.g., the DC voltage $V_{DC}$), such that a primary current $I_P$ flows through the primary winding of the transformer 102. Accordingly, a secondary current $I_S$ flows through the secondary winding of the transformer 102 and flows through the inductor L to the output terminal of the DC to DC converter 100. Meanwhile, the inductor L stores magnetic energy. The control signal 106 can also turn off the switch SW0 to decouple the primary winding from the power source, such that the primary current $I_P$ is cut off. Meanwhile, the inductor L discharges power to the output terminal of the DC to DC converter 100 by transforming the magnetic energy into electrical energy. The control signal 106 can increase the output of the DC to DC converter 100 by increasing the duty cycle of the switch SW0, or decrease the output of the DC to DC converter 100 by decreasing the duty cycle of the switch SW0.

When the primary current $I_P$ is within a specified range, e.g., $|I_P|<I_{SPEC}$, the magnetic flux density 104 of the transformer 102 can be linearly proportional to the primary current $I_P$. As such, an amount of power that is transferred from the primary winding to the secondary winding can be controlled by the primary current $I_P$. However, due to the inherent nature of transformers, if the primary current $I_P$ exceeds a non-saturation range, e.g., $|I_P|>I_{SATU}$, the magnetic flux density 104 of the transformer 102 remains substantially unchanged. The threshold $I_{SATU}$ of the non-saturation range is greater than the threshold $I_{SPEC}$ of the specified range mentioned above. Thus, the primary current $I_P$ may not be able to control the power transfer of the transformer 102 if the primary current $I_P$ exceeds the non-saturation range.

In the DC to DC converter 100, the control signal 106 turns on the switch SW0 at a constant frequency. On one hand, if the DC to DC converter 100 powers a heavy load, the control signal 106 can increase the duty cycle of the switch SW0 such that the DC to DC converter 100 provides enough power to the heavy load. "A "heavy load" as used herein means a load that consumes relatively high power compared to a "light load." Disadvantageously, when the duty cycle of the switch SW0 is greater than a duty cycle threshold, the primary current $I_P$ exceeds the non-saturation range of the transformer 102 and the power transfer of the transformer 102 may not be controlled properly. On the other hand, if the DC to DC converter 100 powers a light load, the control signal 106 can decrease the duty cycle of the switch SW0. A "light load" as used herein means a load that consumes relatively low power compared to a heavy load. However, since the DC to DC converter 100 performs the switching-on operations on the switch SW0 at a constant frequency, the power efficiency of the DC to DC converter 100 is relatively low when the DC to DC converter 100 powers a light load.

FIG. 2A illustrates a circuit diagram of another conventional DC to DC converter 200. The DC to DC converter 200 is an LLC (inductor-inductor-capacitor) resonant converter. The DC to DC converter 200 provides output power to a load 214. As shown in FIG. 2A, the DC to DC converter 200 includes a pair of switches SW1 and SW2, a capacitor 202, an inductor 204, a transformer 208, and a rectifier 212. The inductor 210 represents an equivalent inductor of the primary winding of the transformer 208. A pulse-width modulation (PWM) signal 206 having a 50% duty cycle turns on the switches SW1 and SW2 alternately such that an oscillating current $I_{OSC}$ flows through the capacitor 202, the inductor 204, and the inductor 210. The PWM signal 206 can control the output power of the DC to DC converter 200 by controlling a switching frequency $f_{206}$ of the switches SW1 and SW2.

More specifically, the DC to DC converter 200 has a resonance frequency $f_R$ that is determined by the capacitor 202, the inductor 204, the transformer 208, and the load 214. The PWM signal 206 can control the switching frequency $f_{206}$ of the switches SW1 and SW2 to be close to the resonance frequency $f_R$ so that the DC to DC converter 200 provides more power to the load 214, or the PWM signal 206 can control the switching frequency $f_{206}$ to be away from the resonance frequency $f_R$ so that the DC to DC converter 200 provides less power to the load 214.

However, according to the inherent nature of LLC resonance converters, if the load 214 is a light load, the variation rate of the output voltage $V_{OUT}$ versus the switching frequency $f_{206}$ is either too high or too low. By way of example, FIG. 2B illustrates a relation diagram of the output voltage $V_{OUT}$ versus the switching frequency $f_{206}$ when the DC to DC converter 200 powers a light load. As shown in FIG. 2B, when the switching frequency $f_{206}$ is less than a specified frequency $f_{N1}$, the variation rate of the output voltage $V_{OUT}$ versus the switching frequency $f_{206}$ is relatively high, and the output voltage $V_{OUT}$ may be unstable. When the switching frequency $f_{206}$ is greater than the specified frequency $f_{N1}$, the output voltage $V_{OUT}$ approaches a limit $V_{LM}$ as the switching frequency $f_{206}$ increases. Consequently, the DC to DC converter 200 may not be able to control the output voltage $V_{OUT}$ properly.

SUMMARY

In one embodiment, a controller for a power converter includes a control terminal and control circuitry coupled to the control terminal. The control terminal provides a control signal to control the power converter. A cycle of the control signal includes a first time interval and a second time interval. The control circuitry increases a primary current flowing through a primary winding of transformer circuitry and a secondary current flowing through a secondary winding of the transformer circuitry in the first time interval, and terminates the increasing of the primary current in the second time interval. The control circuitry further controls the first time interval to be inversely proportional to an input voltage provided to the primary winding.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments according to the present invention provide a power converter, e.g., a DC to DC converter, and a controller for the power converter. The controller can control the power conversion performed by transformer circuitry in the power converter. In one embodiment, the controller controls a current flowing through the primary winding of the transformer circuitry such that the output voltage of the power converter is adjusted to a preset level. Advantageously, the controller can control the current flowing through the primary winding to be within a non-saturation range of the transformer circuitry. In the non-saturation range of the transformer circuitry, the current flowing through the primary winding can properly control the output of the power converter.

Figure 1:
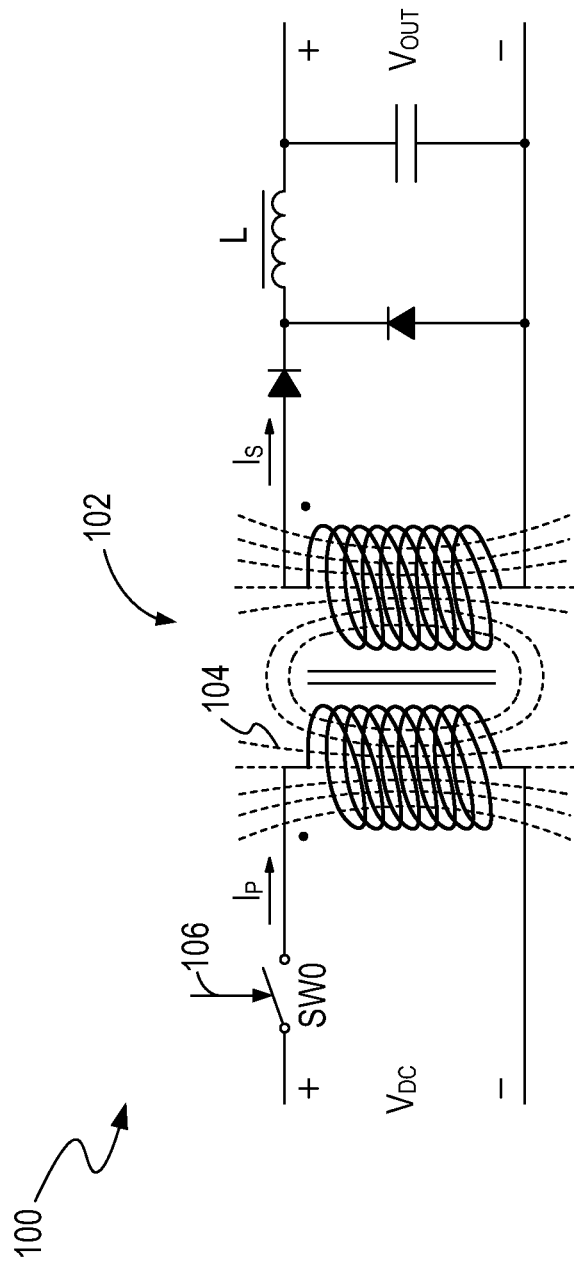
FIG. 1 illustrates a circuit diagram of a conventional power converter.
Figure 2A:
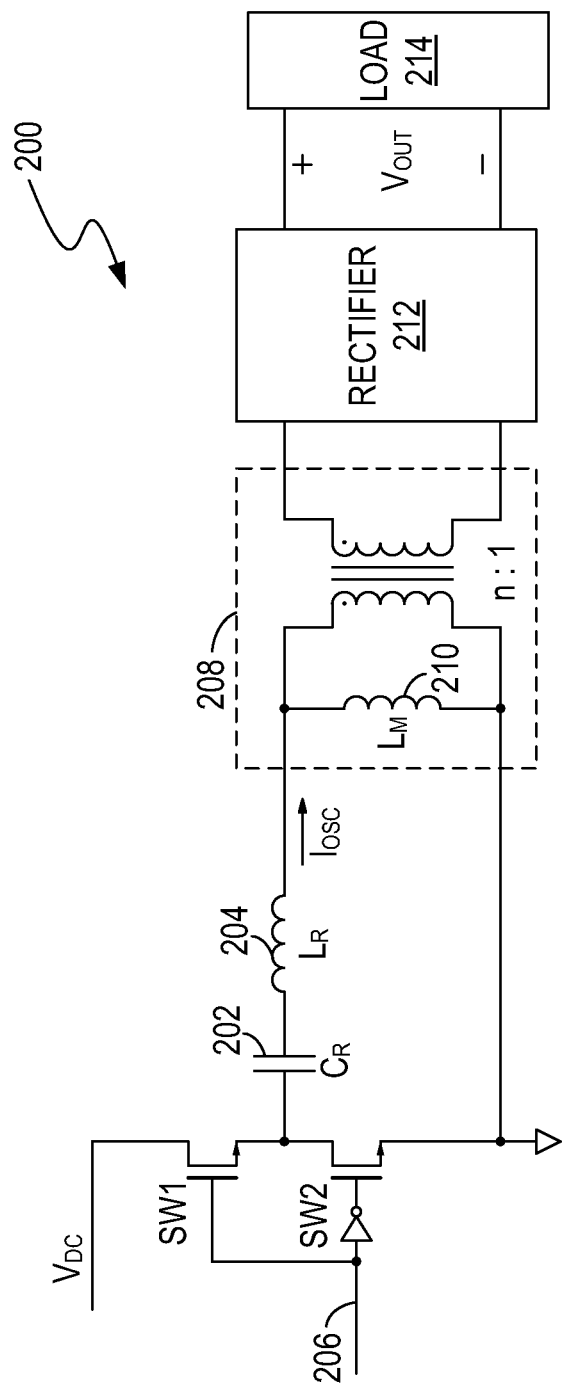
FIG. 2A illustrates a circuit diagram of another conventional power converter.
Figure 2B:
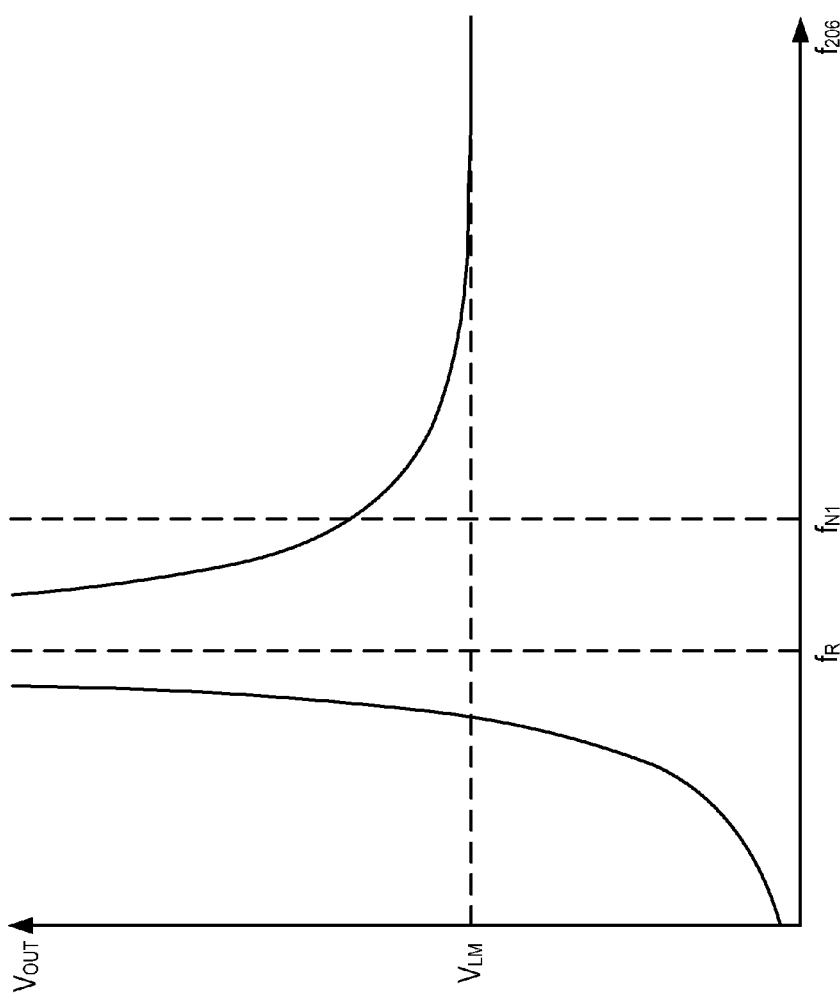
FIG. 2B illustrates a relation diagram of output voltage versus switching frequency associated with the power converter in FIG. 2A.
Figure 3:
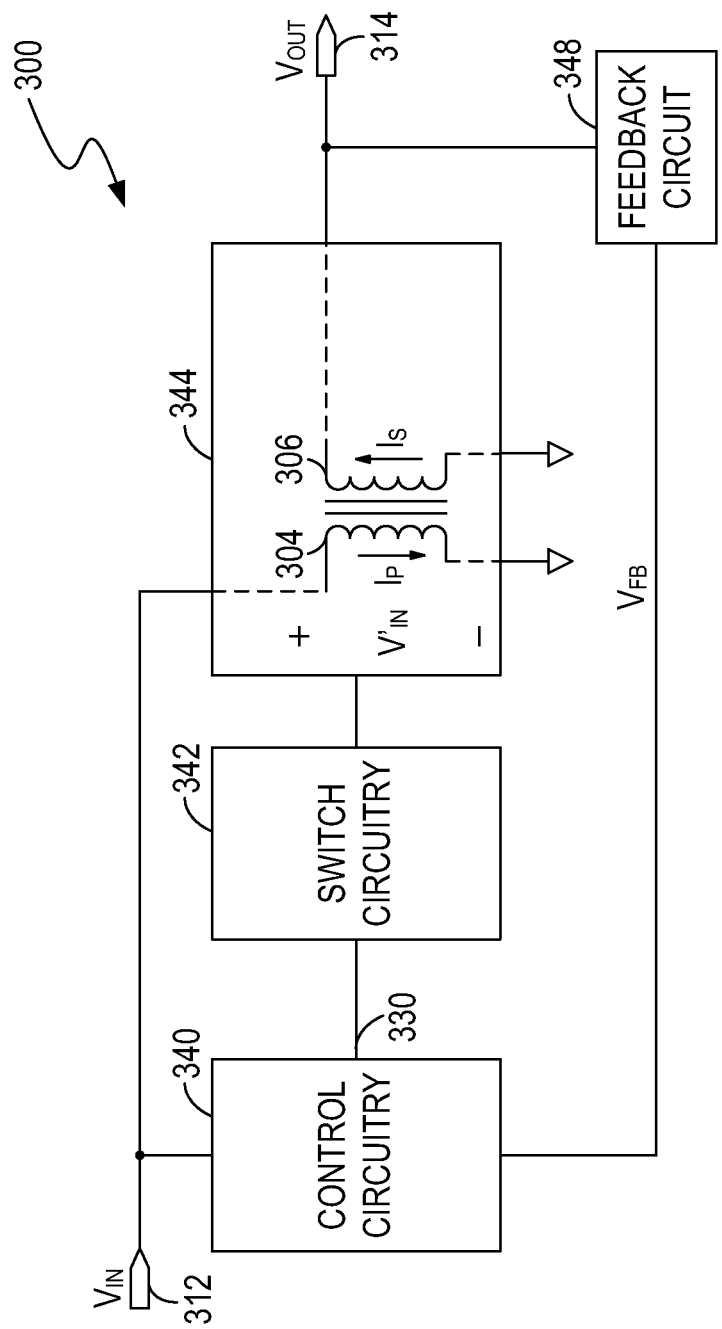
FIG. 3 illustrates a block diagram of an example of a DC to DC converter, in accordance with one embodiment of the present invention.

FIG. 3 illustrates a block diagram of an example of a DC to DC converter 300, in accordance with one embodiment of the present invention. The DC to DC converter 300 is a transformer-based DC to DC converter. As shown in FIG. 3, the DC to DC converter 300 includes control circuitry 340, switch circuitry 342, conversion circuitry 344, and a feedback circuit 348. The control circuitry or controller 340 includes a control terminal to provide a control signal 330 to control the switch circuitry 342, so as to control output power from the conversion circuitry 344 to a load (not shown) coupled to the output terminal 314. The control circuitry 340 also receives a feedback signal $V_{FB}$ indicative of an output voltage $V_{OUT}$ of the DC to DC converter 300 from the feedback circuit 348 and adjusts the control signal 330 according to the feedback signal $V_{FB}$. The control circuitry 340 can control the output voltage $V_{OUT}$ to a preset level $V_{SET}$ by adjusting the control signal 330.

More specifically, the conversion circuitry 344 includes a transformer, e.g., shown as the magnetically coupled primary winding 304 and secondary winding 306 in FIG. 3. The control signal 330 can be a periodic signal. Each cycle $T_{CYC}$ of the control signal 330 includes an ON time interval $T_{ON}$ (also referred to herein as the "first time interval") and an OFF time interval $T_{OFF}$ (also referred to herein as the "second time interval"). In one embodiment, the cycle $T_{CYC}$ of the control signal 330 equals to the summation of the ON time interval $T_{ON}$ and the OFF time interval $T_{OFF}$. The control signal 330 can control the switch circuitry 342 to increase a primary current $I_P$ flowing through the primary winding 304 and a secondary current $I_S$ flowing through the secondary winding 306 in the ON time interval $T_{ON}$. By way of example, in the ON time interval $T_{ON}$, the control signal 330 controls the switch circuitry 342 such that the primary winding 304 receives input power from the input terminal 312. The control signal 330 can further control the switch circuitry 342 to terminate the increasing of the primary current $I_P$ in the OFF time interval $T_{OFF}$. By way of example, in the OFF time interval $T_{OFF}$, the control signal 330 controls the switch circuitry 342 such that the current path of the primary winding 304 is cut off, and therefore the primary current $I_P$ is cut off. Thus, the control circuitry 340 can control the ratio $T_{ON}/T_{CYC}$ (a ratio of an ON time interval $T_{ON}$ in a cycle $T_{CYC}$ to the cycle $T_{CYC}$) to control the output power of the DC to DC converter 300. For example, the control circuitry 340 can increase the ratio $T_{ON}/T_{CYC}$ to increase the output power if the load coupled to the output terminal 314 consumes more power, or decrease the ratio $T_{ON}/T_{CYC}$ to decrease the output power if the load coupled to the output terminal 314 consumes less power. The control circuitry 340 can also increase the ratio $T_{ON}/T_{CYC}$ if the output voltage $V_{OUT}$ is less than the preset level $V_{SET}$, or decrease the ratio $T_{ON}/T_{CYC}$ if the output voltage $V_{OUT}$ is greater than the preset level $V_{SET}$. As a result, the output voltage $V_{OUT}$ is adjusted to the preset level $V_{SET}$.

In one embodiment, during an ON time interval $T_{ON}$, the primary current $I_P$ flowing through the primary winding 304 can increase from a specified level, e.g., zero amperes, to a peak level $I_{PMAX}$. The peak level $I_{PMAX}$ can be given by:

$$I_{PMAX} = V'_{IN} * T_{ON}/L_M, \quad (1)$$

where $V'_{IN}$ represents an input voltage across the primary winding 304, and $L_M$ represents an equivalent inductance of the primary winding 304. The control circuitry 340 controls the ON time interval $T_{ON}$ to be inversely proportional to the input voltage $V'_{IN}$ provided to the primary winding 304, e.g., the voltage across the primary winding 304. By way of example, the control circuitry 340 can control the ON time interval $T_{ON}$ to be equal to $K/V'_{IN}$, such that the peak level $I_{PMAX}$ is equal to $K/L_M$. The coefficient K and the equivalent inductance $L_M$ can be constant. Consequently, the peak level $I_{PMAX}$ can be substantially constant in multiple cycles of the control signal 330. As used herein, "substantially constant" means the peak level $I_{PMAX}$ may vary, e.g., due to non-ideality of the circuit components, but within a range so long as the range is relatively small and can be ignored. The coefficient K can be set such that the peak level $I_{PMAX}$ is within the non-saturation range of the transformer, e.g., the peak level $I_{PMAX}$ is less than a threshold $I_{SATU}$ of the non-saturation range of the transformer.

Advantageously, the control circuitry 340 can control the primary current $I_P$ to be within a non-saturation range of the transformer whether the DC to DC converter 300 powers a heavy load or a light load, and therefore the control circuitry 340 can properly control the output power of the DC to DC converter 300. Moreover, if the DC to DC converter 300 powers a light load, the control circuitry 340 can increase the cycle $T_{CYC}$ of the control signal 330, such that the ratio $T_{ON}/T_{CYC}$ decreases. By increasing the cycle $T_{CYC}$ of the control signal 330, a switching frequency $f_{SW}$ of the switch circuitry 342 is reduced, therefore reducing the number of switching-on operations performed on the switch circuitry 342. Accordingly, the power consumption is reduced and the power efficiency is enhanced.

Figure 4A:
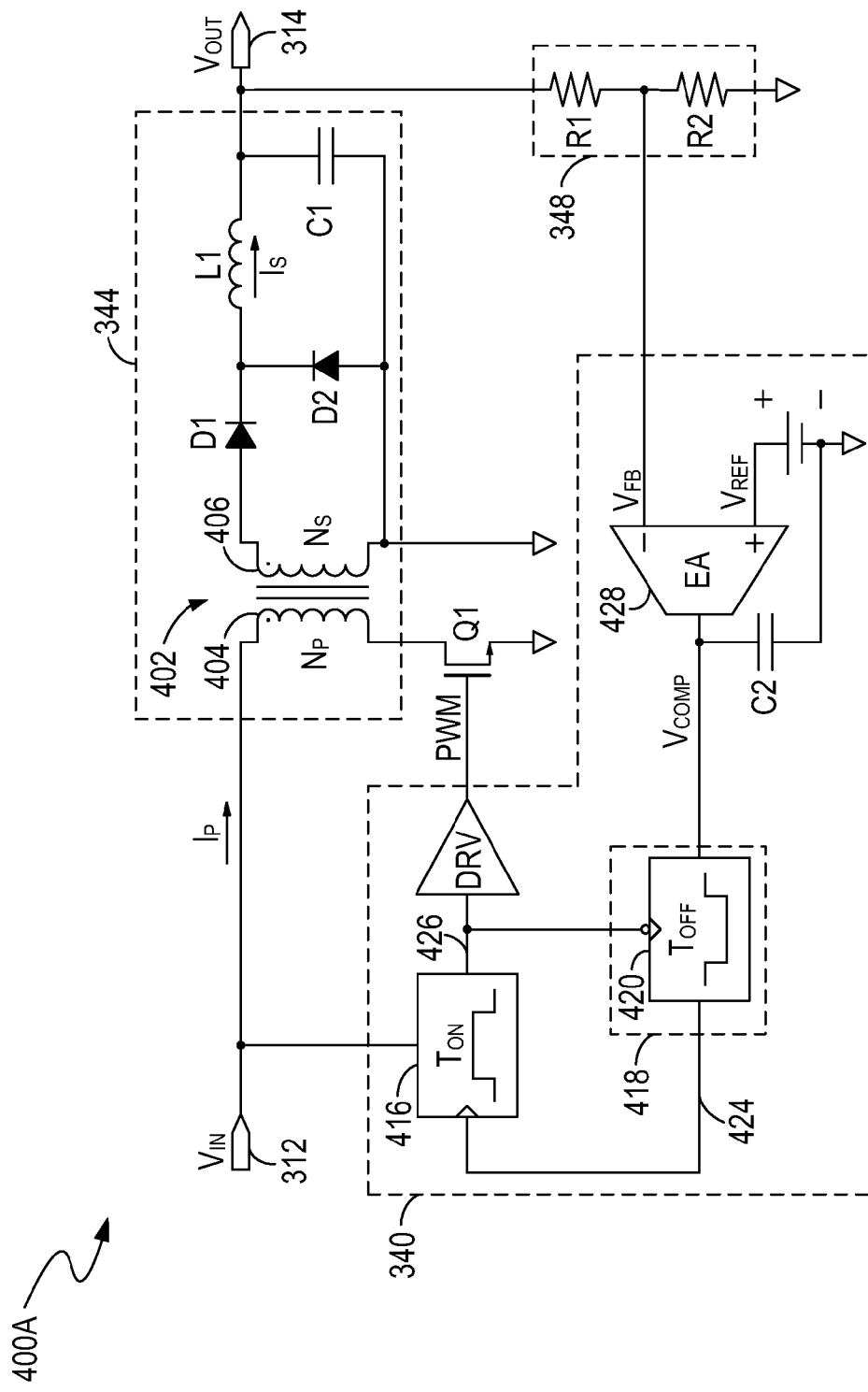
FIG. 4A illustrates a circuit diagram of an example of a DC to DC converter, in accordance with one embodiment of the present invention.

FIG. 4A illustrates a circuit diagram of an example of a DC to DC converter 400A, in accordance with one embodiment of the present invention. FIG. 4A is described in combination with FIG. 3. In the example of FIG. 4A, the DC to DC converter 400A is a forward converter. As shown in FIG. 4A, the control circuitry 340 includes first circuitry 418, second circuitry 416, and an error amplifier 428. The conversion circuitry 344 includes a transformer 402 (e.g., shown as the magnetically coupled primary winding 404 and secondary winding 406), a rectifier (e.g., including diodes D1 and D2), an inductor L1, and a filter capacitor C1. The feedback circuit 348 includes series-coupled resistors R1 and R2. In the example of FIG. 4A, the switch circuitry 342 of FIG. 3 includes a switch Q1 coupled in series with the primary winding 404, and the control signal 330 in FIG. 3 includes a PWM (pulse-width modulation) control signal.

In one embodiment, the control circuitry 340 generates a PWM control signal to turn the switch Q1 on and off alternately, so as to control power conversion of the conversion circuitry 344. The control circuitry 340 further receives a feedback signal $V_{FB}$ (e.g., a voltage across the resistor R2) that is linearly proportional to the output voltage $V_{OUT}$ of the DC to DC converter 300. The control circuitry 340 adjusts the duty cycle of the switch Q1 according to the feedback signal $V_{FB}$, such that the output voltage $V_{OUT}$ is adjusted to a preset level $V_{SET}$. In addition, the control circuitry 340 controls a primary current $I_P$ flowing through the primary winding 404 to be within a non-saturation range of the transformer 402, such that the output voltage $V_{OUT}$ can be controlled properly.

More specifically, the PWM control signal turns on the switch Q1 in the ON time interval $T_{ON}$, and turns off the switch Q1 in the OFF time interval $T_{OFF}$. The duty cycle of the switch Q1 is equal to the ratio of $T_{ON}/T_{CYC}$. On one hand, when the switch Q1 is on, a primary current $I_P$ flows through the primary winding 404 and the switch Q1 to ground. The primary winding 404 receives power from the input terminal 312, and the primary current $I_P$ as well as the magnetic flux density of the transformer 402 increases. Accordingly, a secondary current $I_S$ flows through the secondary winding 406, the diode D1 and the inductor L1 to the output terminal 314, and the secondary current $I_S$ increases as the primary current $I_P$ increases. The inductor L1 stores magnetic energy when the secondary current $I_S$ flows through the inductor L1. On the other hand, when the switch Q1 is off, the primary current $I_P$ is cut off. The inductor L1 discharges power to the output terminal 314 by transforming the magnetic energy to electrical energy. A current can flow from ground to the output terminal 314 via the parallel-coupled diodes D1 and D2, and via the inductor L1. Thus, the control circuitry 340 can increase the output voltage $V_{OUT}$ of the DC to DC converter 400A by increasing the duty cycle of the switch Q1, or can decrease the output voltage $V_{OUT}$ by decreasing the duty cycle of the switch Q1.

In one embodiment, the first circuitry 418 generates a first signal 424 according to a second signal 426 from the second circuitry 416, and the second circuitry 416 generates the second signal 426 according to the first signal 424 from the first circuitry 418. The second circuitry 416 controls the ON time interval $T_{ON}$ of the PWM control signal, and the first circuitry 418 controls the OFF time interval $T_{OFF}$ of the PWM control signal.

More specifically, in the example of FIG. 4A, the second circuitry 416 includes a TON timer, and the first circuitry 418 includes a TOFF timer 420. In one embodiment, the TON timer 416 starts to measure time in response to a first trigger signal, e.g., a rising edge of the first signal 424. The TON timer 416 also controls the PWM control signal to a first level, e.g., a logic-high level, in response to the first trigger signal, and changes the PWM control signal to a second level, e.g., a logic-low level, when an ON time interval $T_{ON}$ expires. By way of example, if a rising edge of the first signal 424 occurs, the TON timer 416 controls the second signal 426 and the PWM control signal to be logic high and starts to measure time. When an ON time interval $T_{ON}$ expires, the TON timer 416 changes the PWM control signal to be logic low by changing the second signal 426 to be logic low. In the example of FIG. 4A, the switch Q1 is turned on if the PWM control signal is logic high and is turned off if the PWM control signal is logic low. Moreover, the TOFF timer 420 starts to measure time in response to a change in the level of the PWM control signal and generates the first trigger signal when an OFF time interval $T_{OFF}$ expires. By way of example, if the PWM control signal is changed from a logic-high level to a logic-low level, the TOFF timer 420 can detect a falling edge of the second signal 426. In response to the falling edge of the second signal 426, the TOFF timer 420 controls the first signal 424 to be logic low and starts to measure time. When an OFF time interval $T_{OFF}$ expires, the TOFF timer 420 changes the first signal 424 from a logic-low level to a logic-high level, and therefore the TON timer 416 can detect a rising edge of the first signal 424.

In one embodiment, the TON timer 416 receives the input voltage $V_{IN}$ provided to the primary winding 404, e.g., the voltage across the primary winding 404, and controls the ON time interval $T_{ON}$ to be inversely proportional to the input voltage $V_{IN}$. Thus, the primary current $I_P$ can have a constant peak level $I_{PMAX}$ that is within the non-saturation range of the transformer 402. In addition, in the example of FIG. 4A, the TOFF timer 420 receives an amplified signal $V_{COMP}$ indicative of the output voltage $V_{OUT}$ and controls the OFF time interval $T_{OFF}$ to be inversely proportional to the amplified signal $V_{COMP}$. More specifically, the error amplifier 428, e.g., an operational transconductance amplifier, compares the feedback signal $V_{FB}$ with a reference signal $V_{REF}$ to control the amplified signal $V_{COMP}$. The reference signal $V_{REF}$ is set according to a preset level $V_{SET}$, e.g., a target level of the output voltage $V_{OUT}$. If the feedback signal $V_{FB}$ is greater than the reference signal $V_{REF}$, e.g., if the output voltage $V_{OUT}$ is greater than the preset level $V_{SET}$, the error amplifier 428 decreases the amplified signal $V_{COMP}$ to increase the OFF time interval $T_{OFF}$, and therefore the duty cycle of the switch Q1 decreases to decrease the output voltage $V_{OUT}$. If the feedback signal $V_{FB}$ is less than the reference signal $V_{REF}$, e.g., if the output voltage $V_{OUT}$ is less than the preset level $V_{SET}$, the error amplifier 428 increases the amplified signal $V_{COMP}$ to decrease the OFF time interval $T_{OFF}$, and therefore the duty cycle of the switch Q1 increases to increase the output voltage $V_{OUT}$. As a result, the output voltage $V_{OUT}$ is adjusted to the preset level $V_{SET}$.

In one embodiment, the DC to DC converter 400A further includes a comparator (not shown in FIG. 4A) for comparing the feedback signal $V_{FB}$ with the reference signal $V_{REF}$. If the feedback signal $V_{FB}$ is greater than the reference signal $V_{REF}$, e.g., if the output voltage $V_{OUT}$ is greater than the preset level $V_{SET}$, the comparator can disable the TON timer 416 to maintain the PWM control signal to be logic-low. The output voltage $V_{OUT}$ can decrease accordingly. When the output voltage $V_{OUT}$ decreases to the preset level $V_{SET}$, the comparator can enable the TON timer 416 to generate the first signal 426.

Figure 4B:
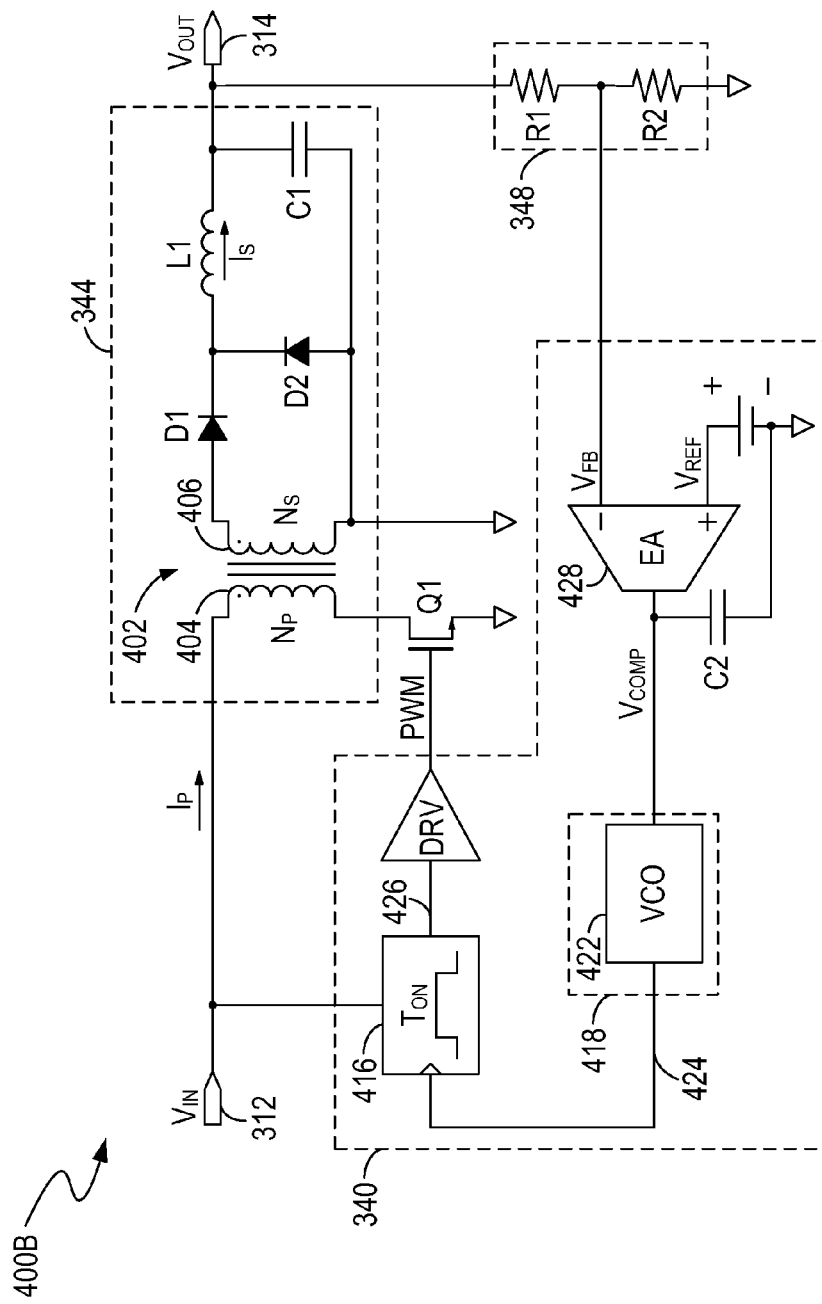
FIG. 4B illustrates a circuit diagram of an example of a DC to DC converter, in accordance with one embodiment of the present invention.

Although the first circuitry 418 includes a timer in the example of FIG. 4A, the invention is not so limited. In another embodiment, the timer is replaced by an oscillator. FIG. 4B illustrates a circuit diagram of an example of a DC to DC converter 400B, in accordance with one embodiment of the present invention. In the example of FIG. 4B, the first circuitry 418 includes a voltage-controlled oscillator (VCO) 422. FIG. 4B is described in combination with FIG. 4A.

The VCO 422 can generate the aforementioned first trigger signal, e.g., rising edges of the first signal 424, at a frequency $f_{SW}$, and control the frequency $f_{SW}$ in proportion to the amplified signal $V_{COMP}$. In one embodiment, if the feedback signal $V_{FB}$ is greater than the reference signal $V_{REF}$, e.g., if the output voltage $V_{OUT}$ is greater than the preset level $V_{SET}$, the error amplifier 428 decreases the amplified signal $V_{COMP}$ to decrease the frequency $f_{SW}$ of the first signal 424, e.g., the frequency $f_{SW}$ of the PWM control signal. Thus, the cycle $T_{CYC}$ of the PWM control signal increases, and the duty cycle of the switch Q1 decreases to decrease the output voltage $V_{OUT}$. If the feedback signal $V_{FB}$ is less than the reference signal $V_{REF}$, e.g., if the output voltage $V_{OUT}$ is less than the preset level $V_{SET}$, the error amplifier 428 increases the amplified signal $V_{COMP}$ to increase the frequency $f_{SW}$ of the first signal 424, e.g., the switching frequency $f_{SW}$ of the PWM control signal. Thus, the cycle $T_{CYC}$ of the PWM control signal decreases, and the duty cycle of the switch Q1 increases to increase the output voltage $V_{OUT}$. As a result, the output voltage $V_{OUT}$ is adjusted to the preset level $V_{SET}$.

Figure 5:
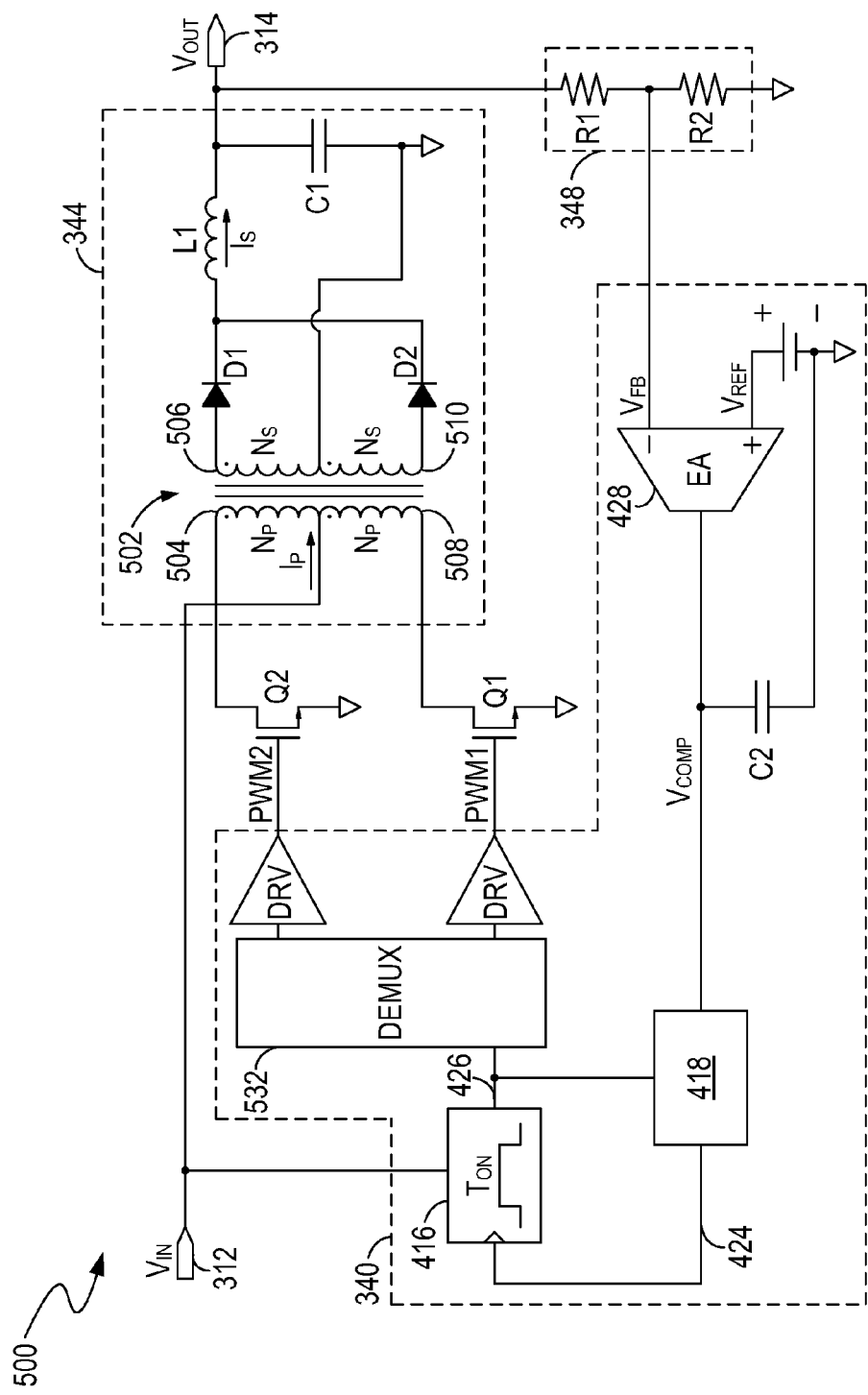
FIG. 5 illustrates a circuit diagram of an example of a DC to DC converter, in accordance with one embodiment of the present invention.
Figure 6:
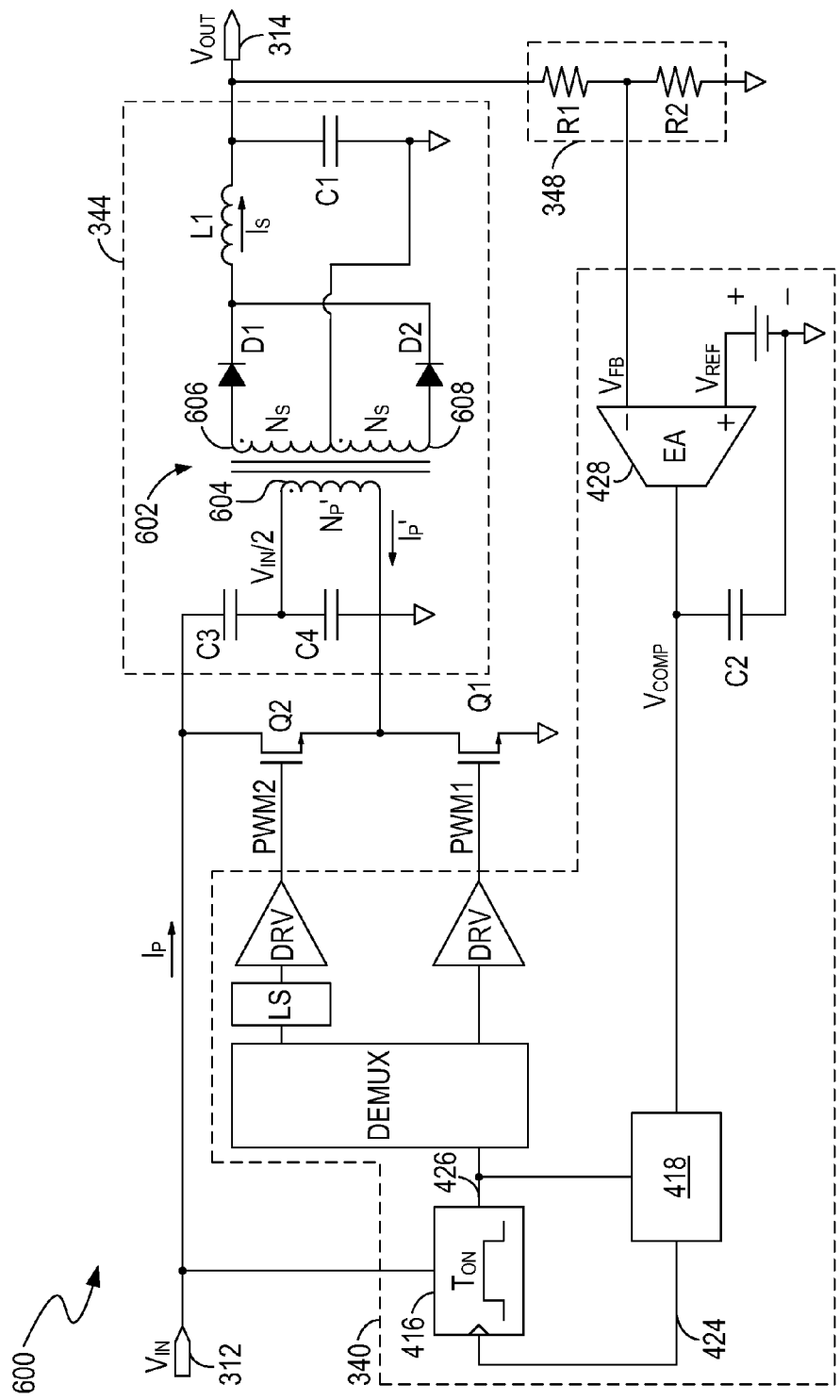
FIG. 6 illustrates a circuit diagram of an example of a DC to DC converter, in accordance with one embodiment of the present invention.
Figure 7:
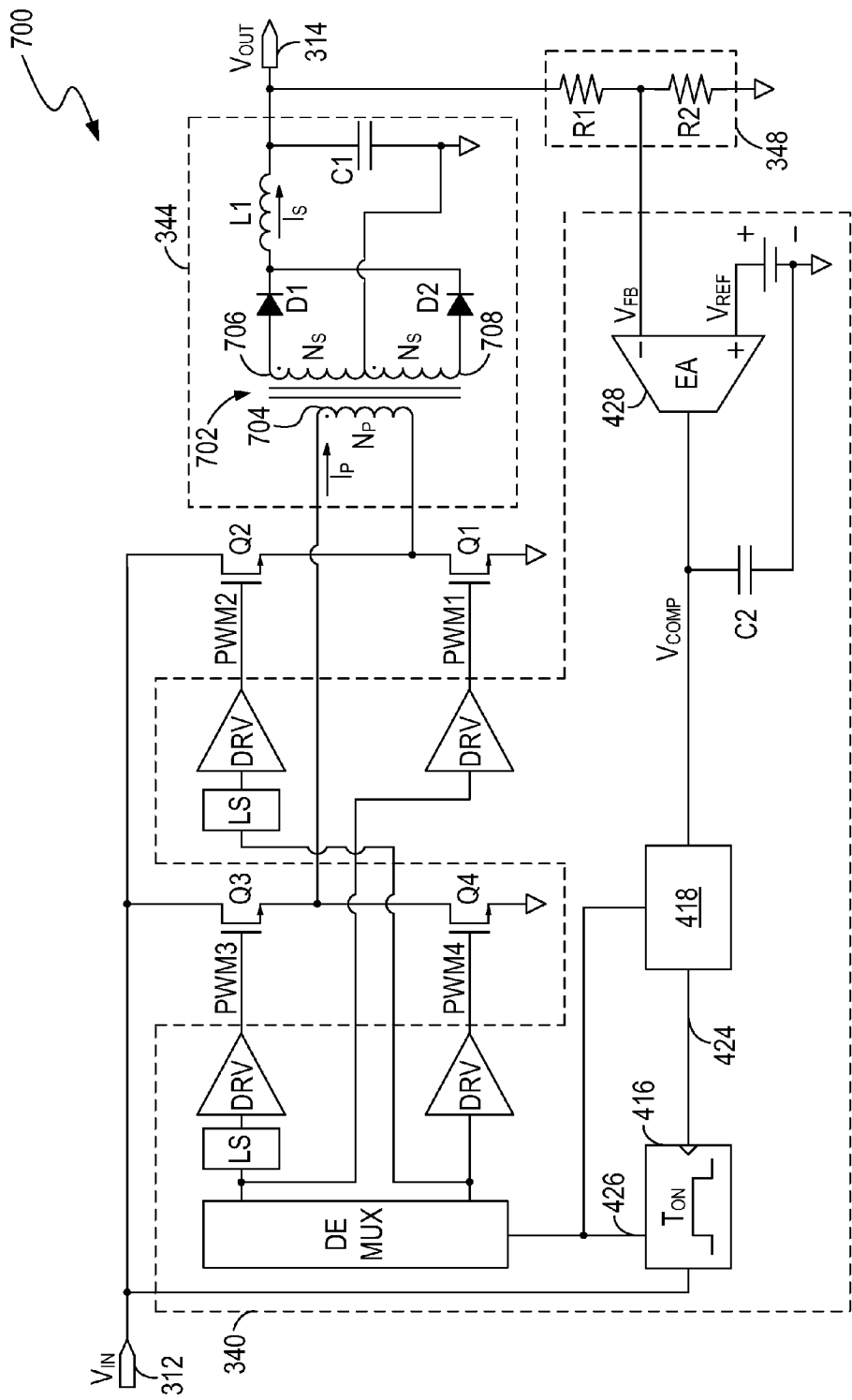
FIG. 7 illustrates a circuit diagram of an example of a DC to DC converter, in accordance with one embodiment of the present invention.

Although in the examples of FIG. 4A and FIG. 4B, the control circuitry 340 controls forward converters 400A and 400B, the invention is not so limited. The control circuitry 340 can be used in other applications such as push-pull converters, half-bridge converters, and full-bridge converters. FIG. 5, FIG. 6 and FIG. 7 illustrate circuit diagrams of examples of a push-pull converter 500, a half-bridge converter 600, and a full-bridge converter 700, respectively, in accordance with embodiments of the present invention. FIG. 5, FIG. 6 and FIG. 7 are described in combination with FIG. 3, FIG. 4A and FIG. 4B.

Referring to FIG. 5, transformer circuitry 502 in the conversion circuitry 344 includes primary windings 504 and 508, and secondary windings 506 and 510 magnetically coupled to the primary windings 504 and 508. The primary windings 504 and 508 can, but not necessarily, have the same coil number $N_P$. The secondary windings 506 and 510 can, but not necessarily, have the same coil number $N_S$. The DC to DC converter 500 includes switches Q2 and Q1 coupled to the primary windings 504 and 508, respectively.

The control circuitry 340 includes a multiplexer 532 to receive the second signal 426 and generate control signals PWM1 and PWM2 to control the switches Q1 and Q2 according to the signal 426. The multiplexer 532 generates the control signals PWM1 and PWM2 alternately. By way of example, the multiplexer 532 generates the control signal PWM1 in a first cycle of the signal 426, generates the control signal PWM2 in a second cycle of the signal 426 that is immediately after the first cycle of the signal 426, and further generates the control signal PWM1 in a third cycle of the signal 426 that is immediately after the second cycle of the signal 426.

In operation, in one embodiment, in a first cycle of the signal 426, the switch Q1 is turned on by the control signal PWM1 for an ON time interval $T_{ON}$, and is turned off by the control signal PWM1 for an OFF time interval $T_{OFF}$. Additionally, the switch Q2 is off in the first cycle of the signal 426. When the switch Q1 is on, a primary current $I_P$ flows through the primary winding 508 from the input terminal 312 to ground, and the primary current $I_P$ increases. Accordingly, a secondary current $I_S$ flows through the secondary winding 506, the diode D1, and the inductor L1 to the output terminal 314, and the inductor L1 stores magnetic energy. When the switch Q1 is off, the primary current $I_P$ is cut off, and the inductor L1 discharges power to the output terminal 314. A current can flow from ground to the output terminal 314 via the diodes D1 and D2, and via the inductor L1. Similarly, in a second cycle of the signal 426, the switch Q2 is turned on by the control signal PWM2 for an ON time interval $T_{ON}$, and is turned off by the control signal PWM2 for an OFF time interval $T_{OFF}$. Additionally, the switch Q1 is off in the second cycle of the signal 426. When the switch Q2 is on, a primary current $I_P$ flows through the primary winding 504 from the input terminal 312 to ground, and the primary current $I_P$ increases. Accordingly, a secondary current $I_S$ flows through the secondary winding 510, the diode D2, and the inductor L1 to the output terminal 314, and the inductor L1 stores magnetic energy. When the switch Q2 is off, the primary current $I_P$ is cut off, and the inductor L1 discharges power to the output terminal 314. A current can flow from ground to the output terminal 314 via the diodes D1 and D2, and via the inductor L1.

Referring to FIG. 6, transformer circuitry 602 in the conversion circuitry 344 includes a primary winding 604 and secondary windings 606 and 608 magnetically coupled to the primary winding 604. The conversion circuitry 344 further includes a capacitor divider, e.g., shown as series-coupled capacitors C3 and C4, coupled between the input terminal 312 and ground. A terminal of the primary winding 604 is coupled to the connection node of the capacitors C3 and C4, and another terminal of the primary winding 604 is coupled to ground via the switch Q1 and is coupled to the output terminal 314 via the switch Q2.

In one embodiment, the control circuitry 340 generates the control signals PWM1 and PWM2 alternately. The generation process of the control signals PWM1 and PWM2 in FIG. 6 is similar to that in FIG. 5. In one embodiment, the capacitors C3 and C4 can, but not necessarily, have the same capacitance. When the switches Q1 and Q2 are off, the input voltage at the primary winding 604, e.g., the voltage at the connection node of the capacitors C3 and C4, can be equal to half of the input voltage $V_{IN}$.

In operation, in one embodiment, in a first cycle of the signal 426, the switch Q1 is turned on by the control signal PWM1 for an ON time interval $T_{ON}$, and is turned off by the control signal PWM1 for an OFF time interval $T_{OFF}$. Additionally, the switch Q2 is off in the first cycle of the signal 426. When the switch Q1 is on, a primary current $I_P'$ flows through the primary winding 604 from the capacitor divider to ground, and the primary current $I_P'$ increases. Accordingly, a secondary current $I_S$ flows through the secondary winding 606, the diode D1, and the inductor L1 to the output terminal 314, and the inductor L1 stores magnetic energy. When the switch Q1 is off, the primary current $I_P'$ is cut off, and the inductor L1 discharges power to the output terminal 314. Similarly, in a second cycle of the signal 426, the switch Q2 is turned on by the control signal PWM2 for an ON time interval $T_{ON}$, and is turned off by the control signal PWM2 for an OFF time interval $T_{OFF}$. Additionally, the switch Q1 is off in the second cycle of the signal 426. When the switch Q2 is on, a primary current $I_P'$ flows through the primary winding 604 from the input terminal 312 to the capacitor divider, and the primary current $I_P'$ increases. Accordingly, a secondary current $I_S$ flows through the secondary winding 608, the diode D2, and the inductor L1 to the output terminal 314, and the inductor L1 stores magnetic energy. When the switch Q2 is off, the primary current $I_P'$ is cut off, and the inductor L1 discharges power to the output terminal 314.

Referring to FIG. 7, transformer circuitry 702 in the conversion circuitry 344 includes a primary winding 704 and secondary windings 706 and 708 magnetically coupled to the primary winding 704. The DC to DC converter 700 includes switches Q1, Q2, Q3 and Q4. A terminal of the primary winding 704 is coupled to ground via the switch Q1 and coupled to the input terminal 312 via the switch Q2. Another terminal of the primary winding 704 is coupled to ground via the switch Q4 and coupled to the input terminal 312 via the switch Q3.

In one embodiment, the control circuitry 340 generates a first pair of control signals PWM1 and PWM3 and a second pair of control signals PWM2 and PWM4, alternately. By way of example, the control circuitry 340 generates the first pair of control signals PWM1 and PWM3 in a first cycle of the signal 426, generates the second pair of control signals PWM2 and PWM4 in a second cycle of the signal 426 that is immediately after the first cycle of the signal 426, and further generates the first pair of control signals PWM1 and PWM3 in a third cycle of the signal 426 that is immediately after the second cycle of the signal 426.

In operation, in one embodiment, in a first cycle of the signal 426, the switches Q1 and Q3 are turned on by the control signals PWM1 and PWM3 for an ON time interval $T_{ON}$, and are turned off by the control signals PWM1 and PWM3 for an OFF time interval $T_{OFF}$. Additionally, the switches Q2 and Q4 are off in the first cycle of the signal 426. When the switches Q1 and Q3 are on, a primary current $I_P$ flows from the input terminal 312 to ground through the switch Q3, the primary winding 704, and the switch Q1, and the primary current $I_P$ increases. Accordingly, a secondary current $I_S$ flows through the secondary winding 706, the diode D1, and the inductor L1 to the output terminal 314, and the inductor L1 stores magnetic energy. When the switches Q1 and Q3 are off, the primary current $I_P$ is cut off, and the inductor L1 discharges power to the output terminal 314. Similarly, in a second cycle of the signal 426, the switches Q2 and Q4 are turned on by the control signals PWM2 and PWM4 for an ON time interval $T_{ON}$, and are turned off by the control signals PWM2 and PWM4 for an OFF time interval $T_{OFF}$. Additionally, the switches Q1 and Q3 are off in the second cycle of the signal 426. When the switches Q2 and Q4 are on, a primary current $I_P$ flows from the input terminal 312 to ground through the switch Q2, the primary winding 704, and the switch Q4, and the primary current $I_P$ increases. Accordingly, a secondary current $I_S$ flows through the secondary winding 708, the diode D2, and the inductor L1 to the output terminal 314, and the inductor L1 stores magnetic energy. When the switches Q2 and Q4 are off, the primary current $I_P$ is cut off, and the inductor L1 discharges power to the output terminal 314.

Advantageously, since the ON time intervals $T_{ON}$ of the control signals that control the switches, e.g., Q1, Q2, Q3 and Q4, associated with the DC to DC converters in FIG. 5, FIG. 6 and FIG. 7 are controlled to be inversely proportional to the voltages across the primary windings in the DC to DC converters, currents flowing through the primary windings can have substantially constant peak levels. The peak levels of the currents flowing through the primary windings can be within the non-saturation ranges of the transformer circuitry.

Figure 8:
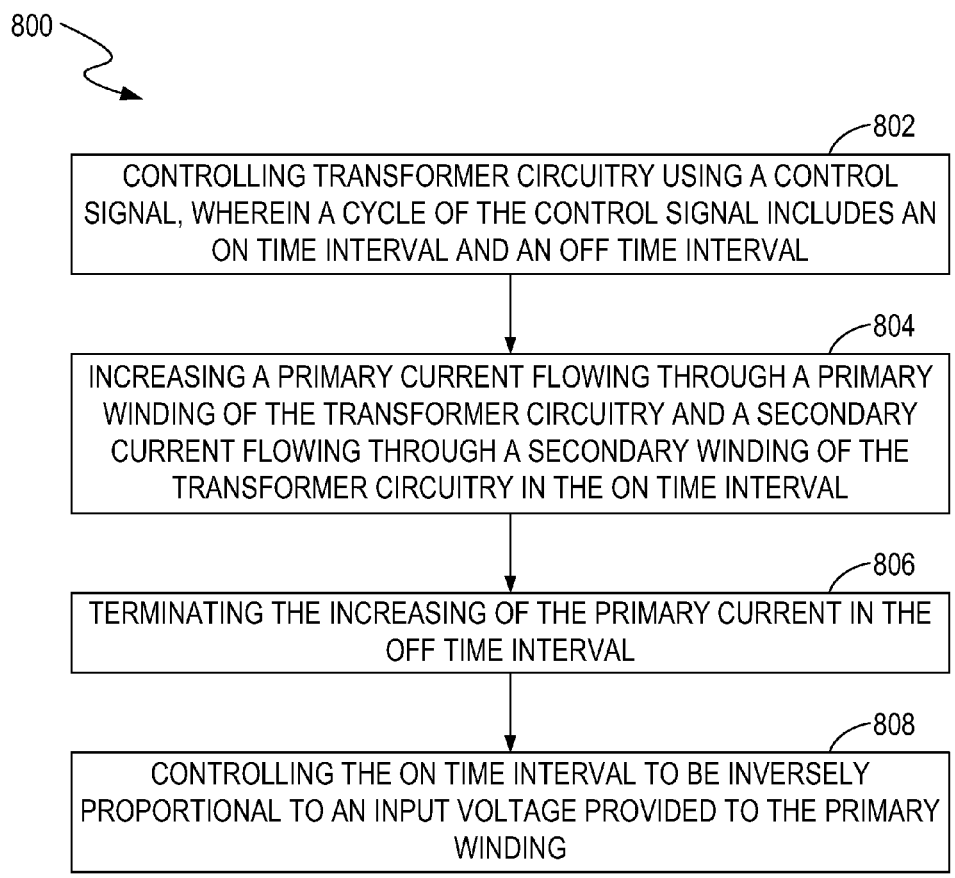
FIG. 8 illustrates a flowchart of examples of operations performed by a DC to DC converter, in accordance with one embodiment of the present invention.

FIG. 8 illustrates a flowchart 800 of examples of operations performed by a DC to DC converter, in accordance with one embodiment of the present invention. FIG. 8 is described in combination with FIG. 3, FIG. 4A, FIG. 4B, FIG. 5, FIG. 6 and FIG. 7.

In block 802, a control signal controls transformer circuitry. The control signal can be a periodic signal, and each cycle of the control signal includes an ON time interval $T_{ON}$ and an OFF time interval $T_{OFF}$. By way of example, the control signal includes the signals 330, 426, PWM, PWM1, PWM2, PWM3 and PWM4 described herein. The transformer circuitry includes the transformer circuitry 402, 502, 602 and 702.

In block 804, the control circuitry 340 increases a primary current flowing through a primary winding of the transformer circuitry and a secondary current flowing through a secondary winding of the transformer circuitry in the ON time interval $T_{ON}$. By way of example, in the ON time interval $T_{ON}$, the control circuitry 340 turns on a corresponding switch such that the primary winding receives power from a power source.

In block 806, the control circuitry 340 terminates the increasing of the primary current in the OFF time interval $T_{OFF}$. By way of example, in the OFF time interval $T_{OFF}$, the control circuitry 340 turns off the corresponding switch such that the current path of the primary winding is cut off.

In block 808, the control circuitry 340 controls the ON time interval $T_{ON}$ to be inversely proportional to an input voltage provided to the primary winding. As a result, the primary current flowing through the primary winding has a substantially constant peak level that is within the non-saturation range of the transformer circuitry.

In summary, embodiments according to the present invention provide DC to DC converters and controllers that control the DC to DC converters. The DC to DC converter includes a transformer. The controller controls a time interval, e.g., during which a primary current flows through the primary winding of the transformer, to be inversely proportional to the input voltage supplied to the primary winding. Thus, the primary current is within a non-saturation range associated with the magnetic flux density of the transformer. As a result, the controller can control the output of the DC to DC converter properly. The present invention can be used in various applications such as isolated power supplies in telecommunication devices, automotive devices, adapters, battery chargers, etc.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller for a power converter, said controller comprising:
   a control terminal configured to provide a control signal to control said power converter, wherein a cycle of said control signal comprises a first time interval and a second time interval immediately following said first time interval; and
   control circuitry coupled to said control terminal and that causes a primary current flowing through a primary winding of transformer circuitry and a secondary current flowing through a secondary winding of said transformer circuitry to increase in said first time interval, terminates the increasing of said primary current in said second time interval immediately following said first time interval, and controls said first time interval to be inversely proportional to an input voltage provided to said primary winding.

2. The controller as claimed in claim 1, wherein said control signal causes said primary current to increase to a peak level during said first time interval, and wherein said peak level is substantially constant over a plurality of cycles of said control signal.

3. The controller as claimed in claim 1, further comprising:
   a switch coupled in series with said primary winding, wherein said switch is turned on and off alternately by said control signal.

4. The controller as claimed in claim 1, wherein said control circuitry comprises a first timer, wherein said first timer starts to measure time in response to a trigger signal, controls said control signal to a first level in response to said trigger signal, changes said control signal to a second level when said first time interval expires, and controls said first time interval to be inversely proportional to said input voltage.

5. The controller as claimed in claim 4, wherein said control circuitry further comprises a second timer coupled to said first timer, wherein said second timer starts to measure time in response to a change in the level of said control signal and generates said trigger signal when said second time interval expires.

6. The controller as claimed in claim 5, wherein said second timer increases said second time interval if an output voltage of said power converter is greater than a preset level, and deceases said second time interval if said output voltage is less than said preset level.

7. The controller as claimed in claim 4, wherein said control circuitry further comprises an oscillator coupled to said first timer and configured to generate said trigger signal at a frequency.

8. The controller as claimed in claim 7, wherein said oscillator decreases said frequency if an output voltage of said power converter is greater than a preset level, and increases said frequency if said output voltage is less than said preset level.

9. The controller as claimed in claim 1, wherein said power converter comprises conversion circuitry that is selected from the group consisting of: a forward converter, a push-pull converter, a half-bridge converter, and a full-bridge converter.

10. A method for controlling a power converter, said method comprising:
    controlling transformer circuitry using a control signal, wherein a cycle of said control signal comprises a first time interval and a second time interval immediately following said first time interval;
    increasing a primary current flowing through a primary winding of said transformer circuitry and a secondary current flowing through a secondary winding of said transformer circuitry in said first time interval;
    terminating said increasing of said primary current in said second time interval immediately following said first time interval; and
    controlling said first time interval to be inversely proportional to an input voltage provided to said primary winding.

11. The method as claimed in claim 10, wherein said increasing said primary current comprises increasing said primary current to a peak level during said first time interval and controlling said peak level to be substantially constant over a plurality of cycles of said control signal.

12. The method as claimed in claim 10, further comprising:
    starting to measure time in response to a trigger signal and controlling said control signal to a first level in response to said trigger signal; and
    changing said control signal to a second level when said first time interval expires.

13. The method as claimed in claim 12, further comprising:
    generating said trigger signal when said cycle of said control signal expires;
    increasing said cycle if an output voltage of a power converter is greater than a preset level; and
    decreasing said cycle if said output voltage is less than said preset level.

14. A power converter comprising:
    transformer circuitry comprising a primary winding and a secondary winding and configured to operate in a plurality of cycles, a cycle of said cycles comprising a first time interval and a second time interval immediately following said first time interval; and
    control circuitry coupled to said transformer circuitry and operable for increasing a primary current flowing through said primary winding and a secondary current flowing through said secondary winding in said first time interval, terminating the increasing of said primary current in said second time interval immediately following said first time interval, and controlling said first time interval to be inversely proportional to an input voltage provided to said primary winding.

15. The power converter as claimed in claim 14, wherein said control circuitry increases said primary current to a peak level during said first time interval, and wherein said peak level is substantially constant over said plurality of cycles.

16. The power converter as claimed in claim 14, further comprising:
    an inductor coupled to said secondary winding and that stores energy in said first time interval and discharges energy in said second time interval.

17. The power converter as claimed in claim 14, wherein said control circuitry increases said cycle if an output voltage of said power converter is greater than a preset level, and decreases said cycle if said output voltage is less than said preset level.

18. The power converter as claimed in claim 14, further comprising:
    a switch coupled in series with said primary winding, wherein said switch is turned on and off alternately by said control circuitry.

19. The power converter as claimed in claim 14, further comprising conversion circuitry that is selected from the group consisting of: a forward converter, a push-pull converter, a half-bridge converter, and a full-bridge converter.

20. The power converter as claimed in claim 14, wherein said control circuitry starts to measure time in response to a trigger signal, increases said primary current in response to said trigger signal, and terminates the increasing of said primary current when said first time interval expires.

* * * * *